United States Patent [19]

Kim

[11] Patent Number: 5,330,141

[45] Date of Patent: Jul. 19, 1994

[54] GARMENT BAG LUGGAGE CART ATTACHMENT

[75] Inventor: Young S. Kim, Cupertino, Calif.

[73] Assignee: Inno Design, Inc., Sunnyvale, Calif.

[21] Appl. No.: 890,717

[22] Filed: May 29, 1992

[51] Int. Cl.$^5$ ............................................. A63B 55/08
[52] U.S. Cl. ........................................ 248/98; 280/37; 280/641
[58] Field of Search ................ 280/37, 641; 211/198; 248/98, 97, 127, 128, 129, 130; 182/153, 181, 182, 185

[56] References Cited

U.S. PATENT DOCUMENTS

| D. 295,337 | 4/1988 | Bogart | D34/17 |
|---|---|---|---|
| 192,700 | 5/1862 | O'Connor | 182/181 |
| 389,336 | 9/1888 | Stunden | 211/198 |
| 1,043,038 | 10/1912 | Alexander | 280/35 |
| 2,847,227 | 8/1958 | Lankford | 248/98 |
| 2,881,966 | 4/1959 | Holmer | 182/181 |
| 2,965,159 | 12/1960 | Fridolph | 211/198 X |
| 3,148,746 | 9/1964 | Tuculano | 182/153 |
| 3,400,942 | 9/1968 | Hull | 280/35 |
| 3,722,905 | 3/1973 | Solomon | 280/39 |
| 3,841,650 | 10/1974 | Miskelly | 280/37 |
| 3,964,762 | 6/1976 | Adams | 280/79.11 X |
| 4,113,056 | 9/1978 | De Lorenzo | 182/181 |
| 4,429,765 | 2/1984 | Garcia | 182/153 |
| 4,502,563 | 3/1985 | Pershon | 182/153 |
| 4,756,384 | 7/1988 | Maddox | 182/185 X |
| 5,133,461 | 7/1992 | Martinell | 211/198 X |

FOREIGN PATENT DOCUMENTS 2215192  9/1989  United Kingdom ................ 182/181

Primary Examiner—David A. Scherbel
Assistant Examiner—Korie H. Chan
Attorney, Agent, or Firm—Cooley Godward Castro Huddleson & Tatum

[57] ABSTRACT

A garment bag luggage cart attachment (10) fastens to a conventional soft-sided garment bag (12), which folds along spine (14) and has a handle (16) midway along the spine (14). Attachment (10) is formed from a first frame member (18) and a second frame member (20) pivotally connected to the first frame member (18) at (22) and (24). A flexible fabric belt (42) is permanently attached at one end to raised central portion (26) on the first frame member (18) and is releasably attached around raised central portion (30) on the second frame member (20) by means of Velcro type fasteners at (44). A set of short straps (46) are fastened to bottoms (28) and (32) of the first and second frame members (18) and (20). Straps (48) are fastened to strap rings (36) at ends (38) and (40). The straps (48) are double layered, with layers (50) and (52) free to separate along either side of the garment bag (12). Releasable buckles (58) fasten the short straps (46) to the layers (50) and (52) of the straps (48) to hold the garment bag securely in place on the attachment (10).

9 Claims, 5 Drawing Sheets

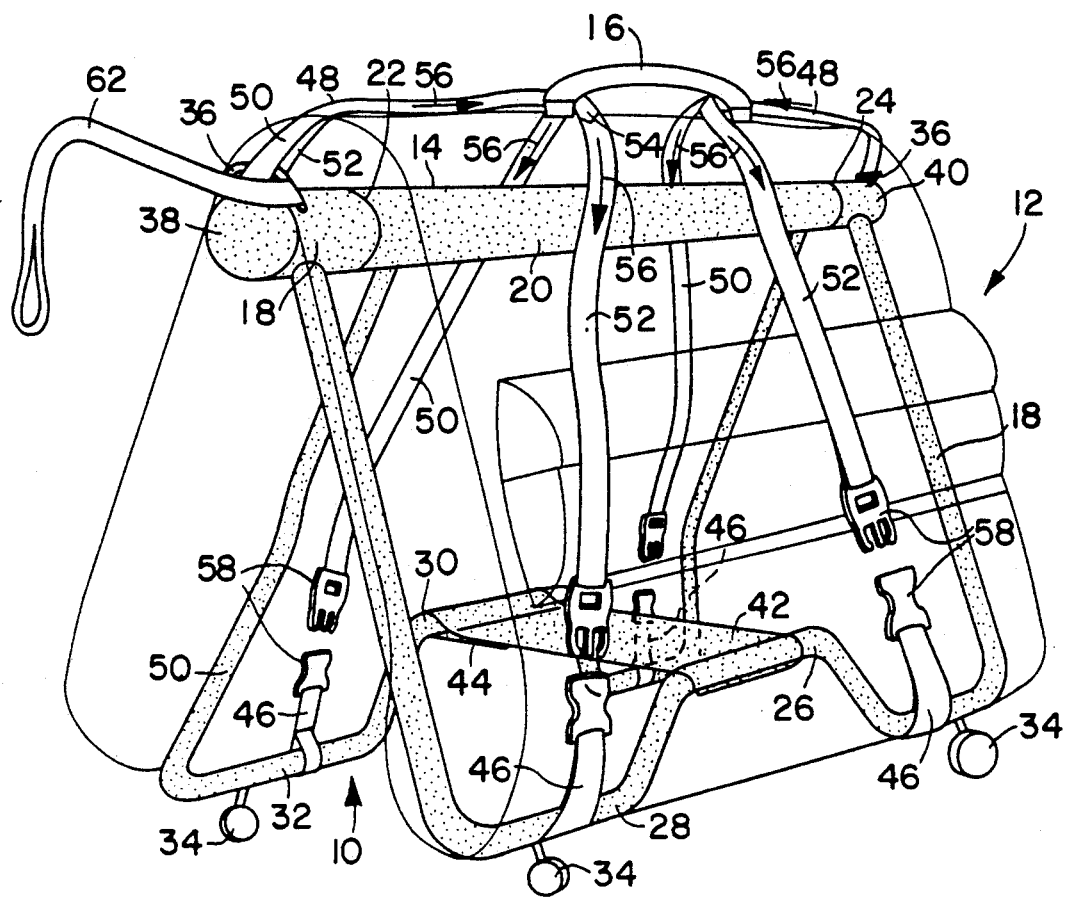
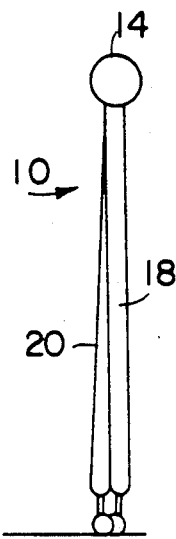 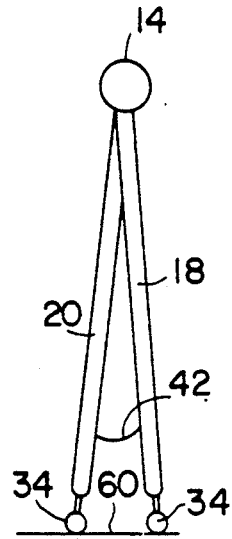 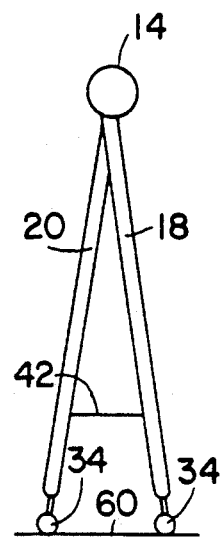
FIG. 1
FIG. 2A   FIG. 2B   FIG. 2C

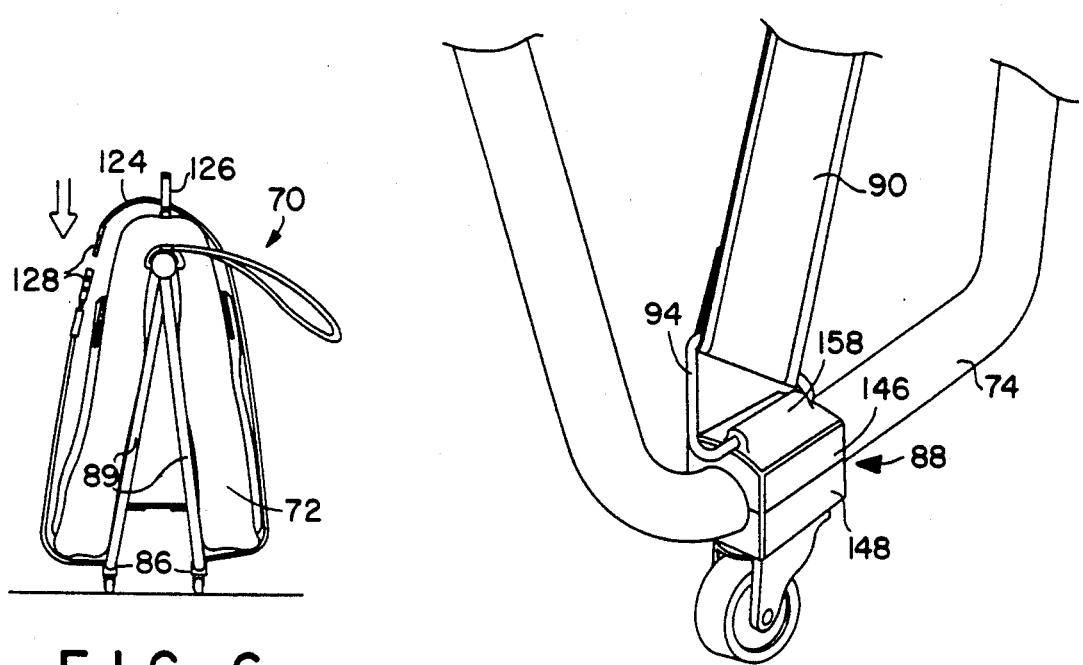
FIG. 6
FIG. 8
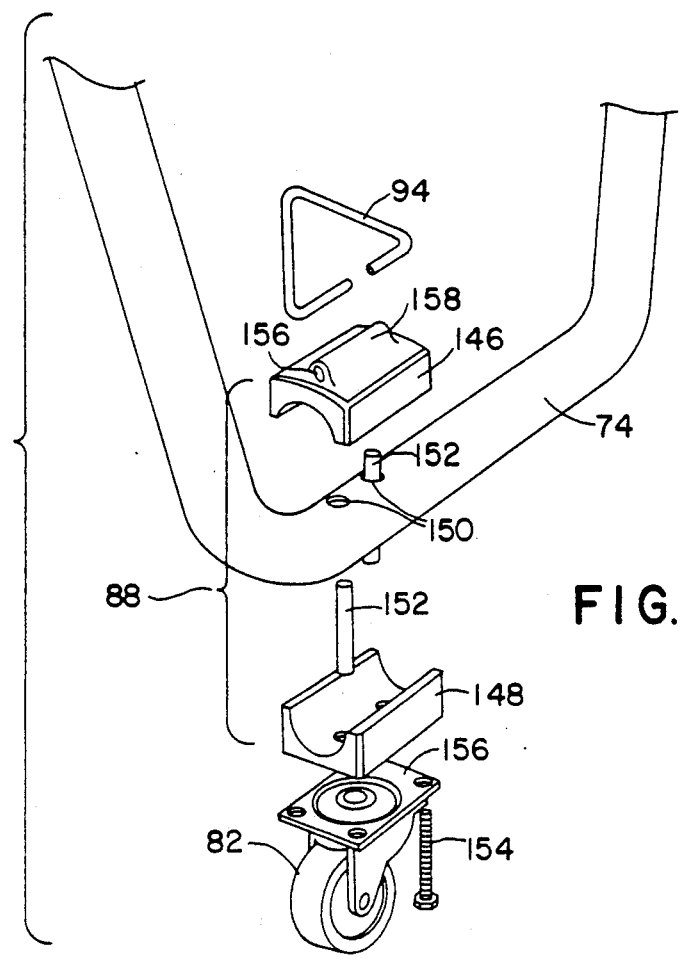
FIG. 9

GARMENT BAG LUGGAGE CART ATTACHMENT

BACKGROUND OF THE INVENTION

1. Field of the Invention

The present invention relates generally to a luggage cart attachment that is specially adapted for use with garment bags. More particularly, it relates to such a luggage cart attachment that can be used to pull the garment bag on wheels and which allows the garment bag to be hung in a conventional manner.

2. Description of the Prior Art

Folding, wheeled carts are known for holding conventional suitcases, so that they can be pulled behind the user. Some suitcases also come with built-in wheels and a strap so that they can be pulled behind the user without a separate cart. However, the wheeled carts for conventional suitcases are not satisfactory for holding garment bags, and the user is left with the choice of carrying the garment bag from a handle or from a shoulder strap attached to the spine of the garment bag.

SUMMARY OF THE INVENTION

Accordingly, it is an object of this invention to provide a luggage cart attachment for use with a garment bag.

It is another object of the invention to provide such a luggage cart attachment that will allow the garment bag to be hung in a conventional manner with the luggage cart attachment in place.

It is a further object of the invention to provide such a luggage cart attachment that assumes a configuration for pulling behind a user when the garment bag is set on the ground with the luggage cart attachment in place.

It is still another object of the invention to provide such a luggage cart attachment that provides the functionality of a luggage cart for a garment bag without interfering with conventional use of the garment bag.

The attainment of these and related objects may be achieved through use of the novel garment bag luggage cart attachment herein disclosed. A garment bag luggage cart attachment in accordance with this invention has first and second frame members pivotally connected to form a spine along which the first and second frame members are free to pivot with respect to one another. A means is provided for attaching the garment bag over the spine to the first and second frame members with first and second sides of the garment bag on the first and second frame members. A means limits an extent of pivoting motion of the first and second frame members with respect to one another.

The attainment of the foregoing and related objects, advantages and features of the invention should be more readily apparent to those skilled in the art, after review of the following more detailed description of the invention, taken together with the drawings, in which:

BRIEF DESCRIPTION OF THE DRAWINGS

FIG. 1 is a perspective view of a garment bag luggage cart attachment in accordance with the invention.

FIGS. 2A–2E are a series of end views showing the garment bag luggage cart attachment of FIG. 1 in different positions during its use.

FIG. 6 is an end view of the garment bag luggage cart attachment of FIGS. 4–5 in use.

FIG. 8 is a perspective view of a portion of the garment bag luggage cart attachment of FIGS. 4–7.

FIG. 9 is an exploded perspective view of the garment bag luggage cart attachment portion of FIG. 8.

DETAILED DESCRIPTION OF THE INVENTION

Figure 2D:
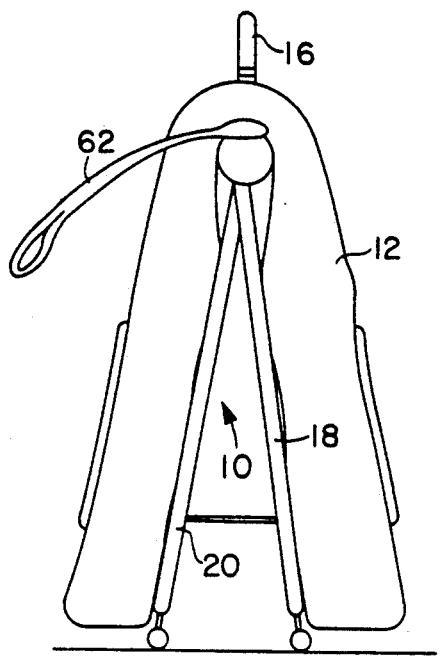
Figure 2E:
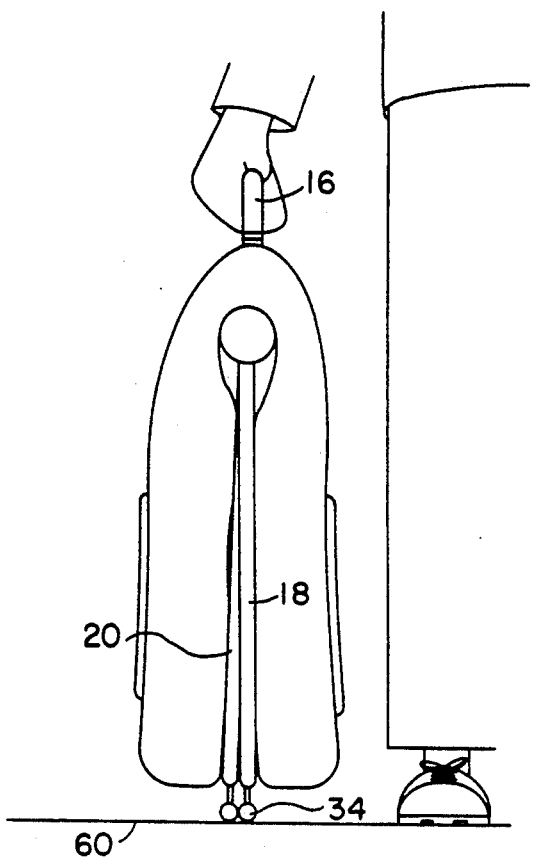

Turning now to the drawings, more particularly to FIG. 1, there is shown a garment bag luggage cart attachment 10 fastened to a conventional soft-sided garment bag 12, which folds over spine 14 of the luggage cart attachment and has a handle 16 midway along the spine 14. The luggage cart attachment 10 is formed from a first frame member 18 and a second frame member 20 pivotally connected to the first frame member 18 at 22 and 24. The first frame member 18 is generally U-shaped in configuration, with a raised central portion 26 on bottom 28 of the U-shape as shown. The second frame member 20 is generally D-shaped in configuration with a corresponding raised central portion 30 on bottom 32 of the D-shape as shown. This essentially two piece construction for the primary structural members 18 and 20 means that the luggage cart attachment is easily fabricated from a suitable plastic material, such as rigid polypropylene, with two molds. Alternatively, the frame members 18 and 20 could be fabricated with a suitable metal, such as aluminum, or a carbon fiber composite. Caster wheels 34 are pivotally mounted on the bottoms 28 and 32. Strap rings 36 are pivotally attached to ends 38 and 40 of the first frame member 18. A flexible fabric belt 42 is permanently attached at one end to the raised central portion 26 on the first frame member 18 and is releasably attached around the raised central portion 30 on the second frame member 20 by means of Velcro type fasteners at 44. A set of short straps 46 are fastened to the bottoms 28 and 32 of the first and second frame members 18 and 20. Straps 48 are fastened to the strap rings 36 at the ends 38 and 40. The straps 48 are double layered, with layers 50 and 52 being fastened together, such as by stitching at 54 proximate to handle 16 of the garment bag 12, but are free to separate along either side of the garment bag 12 beyond their attachment at 54. Arrows 56 show how the straps are positioned around the garment bag 12 to secure it on the attachment 10. Releasable buckles 58 fasten the short straps 46 to the layers 50 and 52 of the straps 48 to hold the garment bag securely in place on the attachment 10.

As shown in FIG. 2A, when the garment bag 12 is not on the luggage cart attachment 10, the first and second frame members 18 and 20 fold together for storage. When it is desired to use the attachment 10, pressing down on spine 14 with the caster wheels 34 resting on floor 60 or other hard surface causes the first and second frame members 18 and 20 to pivot with respect to one another as shown in FIGS. 2B and 2C, until the flexible fabric belt 42 is pulled taut. The garment bag 12 is then placed over the luggage cart attachment as shown in FIGS. 1 and 2D, the straps 48 passed through the handle 16 and the buckles 58 fastened to secure the garment bag 12 on the luggage cart attachment 10. With the luggage cart attachment 10 in the configuration shown in FIGS. 1 and 2D, strap handle 62 is used to pull the garment bag 12 on the luggage cart attachment 10 behind the user while walking. Alternatively, the garment bag handle 16 is grasped and held up, so that the frame members 18 and 20 fold together. The garment bag 10 can then be carried along, with the caster wheels 34 either on the floor 60 so that the weight of the garment bag 12 is partially supported or with the caster wheels 34 off the ground. The user is able to shift between the use of strap handle 62 or the garment bag handle 16 easily in order to avoid muscle fatigue while transporting the garment bag 12. When the user releases the handle 16, the weight of the garment bag 12 on the luggage cart attachment causes the frame members 18 and 20 to pivot with respect to each other to the position shown in FIG. 2D.

Figure 3A:
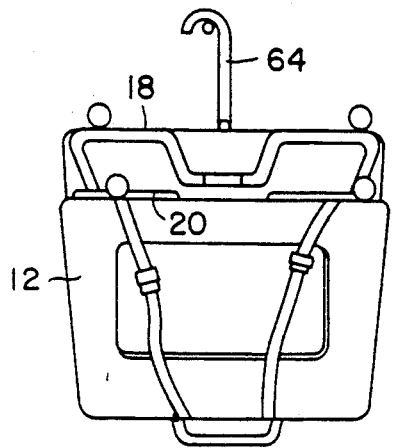
FIGS. 3A and 3B are two side views showing the garment bag luggage cart attachment of FIG. 1 in additional positions during its use.
Figure 3B:
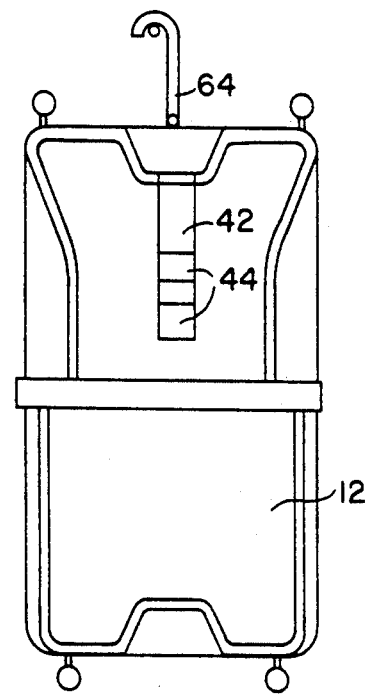
Figure 4:
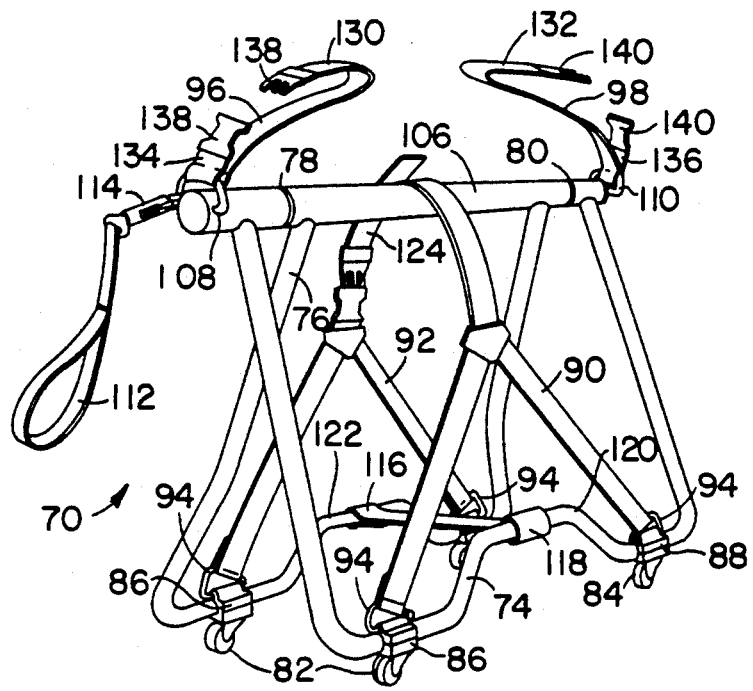
FIG. 4 is a perspective view of a second embodiment of a garment bag luggage cart attachment in accordance with the invention.

As shown in FIG. 3A, the garment bag 12 is hung from hook 64 on the garment bag 12 with the first and second frame members 18 and 20 pivoted together. Alternatively, the Velcro fastener 44 of flexible fabric belt 42 is released, and the garment bag 12 hung full length, as shown in FIG. 3B.

FIGS. 4-7 show another luggage cart attachment 70 for a garment bag 72. As in the luggage cart attachment 10 of FIGS. 1-3B, the luggage cart attachment 70 comprises an outer frame member 74 and an inner frame member 76 pivotally connected to the outer frame member 74 at 78 and 80. Swiveling front caster wheels 82 and non-swiveling rear caster wheels 84 are attached to the outer frame member 74 and the inner frame member 76 with wheel mounts 86 and 88. As is best seen in FIG. 6, the wheel mounts are attached to the outer and inner frame members 74 and 76 at an angle of 15 degrees with respect to sides 89 of the outer and inner frame members 74 and 76, so that the wheels are vertical when the outer and inner frame members have pivoted to the open position shown. Right and left generally Y-shaped primary strap assemblies 90 and 92 are fastened to the wheel mounts 86 and 88 by strap mounting clips 94. (The designations right and left are with respect to the attachment 70 in the orientation of FIG. 4.) Fastening strap assemblies 96 and 98 are attached to cap plugs 100 mounted in ends 102 and 104 of inner frame member 76 top tube 106 by front clip 108 and rear clip 110. Pull strap assembly 112 is fastened to the front clip 108 by swiveling clip 114. Left and right structure strap assemblies 116 and 118 are attached to raised portions 120 and 122 of the outer and inner frame members 74 and 76. The structure strap assemblies 116 and 118 have mating Velcro fastener hooks and loops to join the assemblies 116 and 118 together to provide a limit on the extent of pivoting between the outer and inner frame members 74 and 76 when in the open position as shown.

Figure 5:
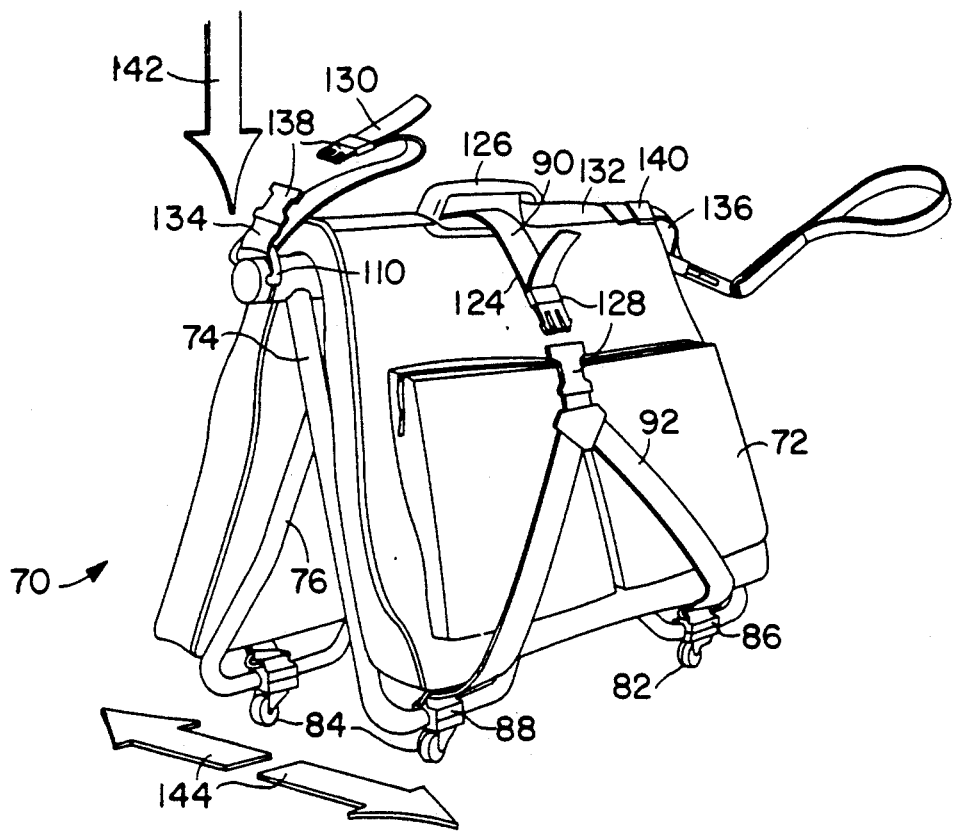
FIG. 5 is a perspective view of the garment bag luggage cart attachment of FIG. 4 in use, but with the attachment rotated 180 degrees about a vertical axis from the position shown in FIG. 4.
Figure 7:
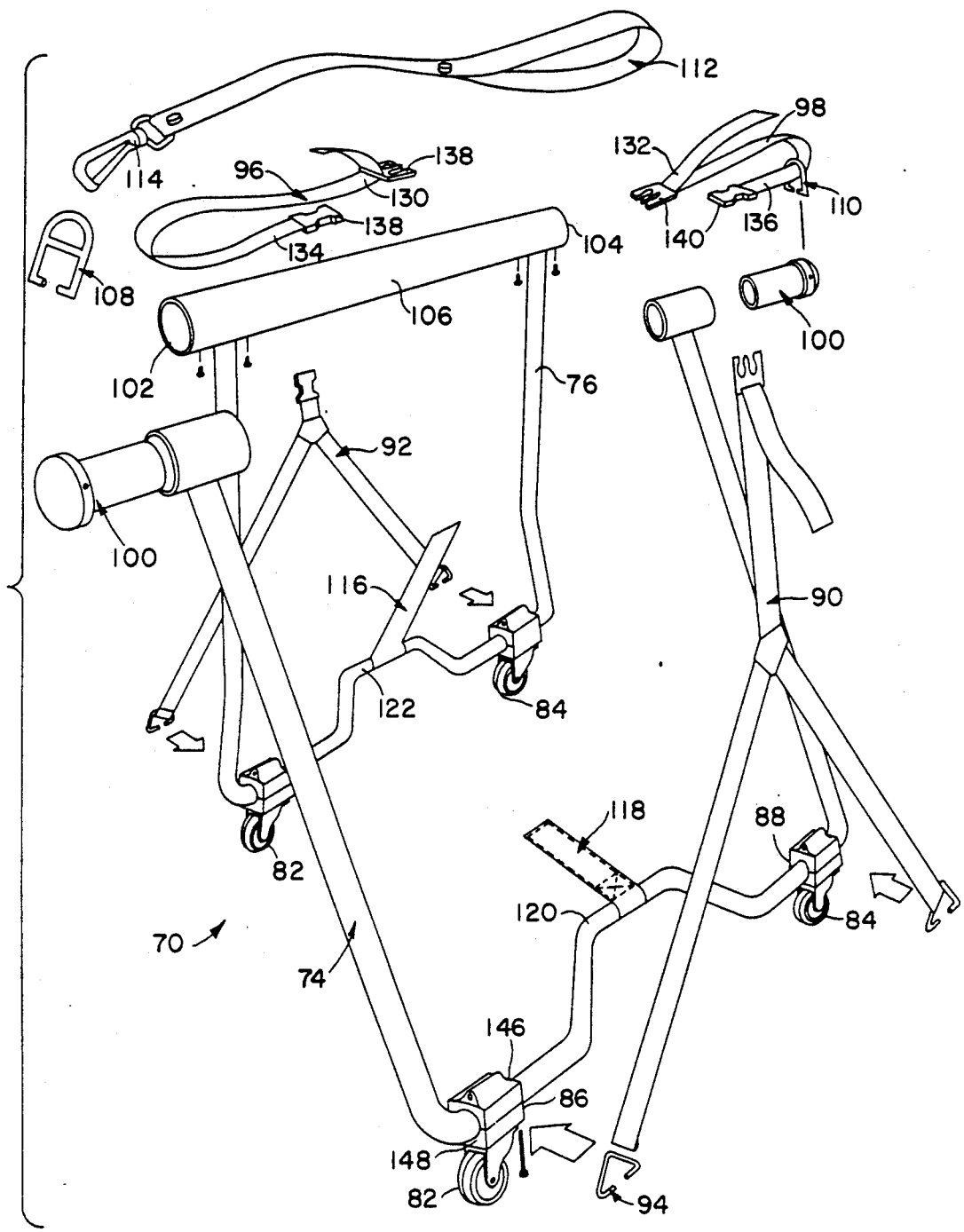
FIG. 7 is an exploded perspective view of the garment bag luggage cart attachment of FIGS. 4–6.

In use of the luggage cart attachment 70, the garment bag 72 is placed over the attachment 70 as shown in FIGS. 5 and 6, and end 124 of the left primary strap assembly 90 is passed through handle 126 of the garment bag 72. The right and left primary strap assemblies 90 and 92 are then fastened together with releasable buckle 128. Ends 130 and 132 of the fastening strap assemblies 96 and 98 are then passed through the handle 126 of the garment bag 72 and joined to ends 134 and 136 with releasable buckles 138 and 140. The garment bag 72 is now held securely in place on the luggage cart attachment 70. As indicated by arrows 142 and 144 in FIG. 5, downward force on the luggage cart attachment 70 causes the outer and inner frame members 74 and 76 to pivot with respect to each other to the maximum open position of the attachment 70 permitted by the structure strap assemblies 116 and 118.

Details of the wheel mounts 86 are shown in FIGS. 8-9. The wheel mounts 88 have essentially the same construction. Upper and lower halves 146 and 148 are mounted over apertures 150 in the outer and inner frame members 74 and 76 by pins 152. Bolt 154 mounts to the swivel wheel 82 bracket 156. Strap mounting clip 94 extends into passage 156 along the length of projection 158 on the upper half 146. Other than as shown and described, the construction and operation of the FIGS. 4-9 embodiment of the invention is the same as that of the FIGS. 1-3B embodiment.

It should now be readily apparent to those skilled in the art that a novel luggage cart attachment for a garment bag capable of achieving the stated objects of the invention has been provided. The luggage cart attachment allows the garment bag to be hung in a conventional manner with the luggage cart attachment in place. The luggage cart attachment assumes a configuration for pulling behind a user when the garment bag is set on the ground with the luggage cart attachment in place. The luggage cart attachment provides the functionality of a luggage cart for a garment bag without interfering with conventional use of the garment bag.

It should further be apparent to those skilled in the art that various changes in form and details of the invention as shown and described may be made. It is intended that such changes be included within the spirit and scope of the claims appended hereto.

What is claimed is:

1. A luggage cart in combination with a garment bag having first and second sides and a handle which extends from said garment bag having a direction extending upward from said luggage cart when said garment bag is positioned on said luggage cart said luggage cart comprising:

first and second frame members pivotally coupled to each other proximate a top peripheral edge of at least one of said first and second frame members, said first and second frame members each having an interior side and an exterior side, the coupled top peripheral edge of said frame members defining a spine for supporting said garment bag thereon with said first and second sides of said garment bag each positioned adjacent said exterior side of one of said first and second frame members and extending downward from the top peripheral edge of said frame members, said first and second frame members further being formed for at least partially supporting said first and second sides of said garment bag on the exterior sides of said frame members, said first and second frame members being free to pivot about said spine with respect to one another, securing means provided on at least one of said first and second frame members for securing a garment bag to said first and second frame members with first and second sides of the garment bag each positioned adjacent said exterior side of one of said first and second frame members and extending downward from the top peripheral edge of said frame members when the garment bag is supported on said spine, and means for selectively limiting pivotal movement of said first and second frame members about said spine with respect to one another, said means for selectively limiting pivotal movement of said first and second frame members defining a maximum angle of separation between the interior sides of said first and second frame members.

2. The combination of claim 1, in which said means for securing said garment bag to said first and second frame members comprises a pair of double layer straps each extending from one of first and second ends of said spine, said double layer straps each having first and second layers, said layers being separable along a given length for positioning one of said layers proximate one of said first and second frame members and the other of said layers proximate another of said first and second frame members, said straps being formed for the passage of one of said layers through the handle and across one of the first and second sides of said garment bag positioned on said spine, said layers each having a distal end mountable to one of said first and second frame members, and means for attaching said distal ends of said double layer straps to said first and second frame members, said garment bag being positioned on said spine with said first and second sides of said garment bag each positioned adjacent said exterior side of one of said first and second frame members and extending downward from the top peripheral edge of said frame members, with one of said layers of each of said double layer straps passed through said handle of said garment bag and across one of said first and second sides of said garment bag.

3. The combination of claim 2 in which said means for attaching the distal ends of said double layer straps comprises mating straps for the layers of said pair of double layer straps, said mating straps being attached to a bottom of said first and second frame members, said mating straps and the distal ends of said double layer straps each having portions of releasable fasteners.

4. The combination of claim 1 in which said means for selectively limiting pivotal movement of said first and second frame members comprises a flexible belt releasibly connected between said first and second frame members.

5. The combination of claim 1 additionally comprising a flexible strap handle connected to an end of said spine.

6. The combination of claim 1 in which said first and second frame members are each integrally formed in a single piece.

7. The combination of claim 1, in which said means for securing said garment bag to said first and second frame members comprises mating primary straps provided on a bottom of said first and second frame members, said primary straps each having a distal end extending towards said spine for releasable engagement with said distal end of the remainder of said primary straps with at least one of said primary straps extending across said spine, said primary straps being formed to extend along the first and second sides of said garment bag and at least one of said primary straps being formed to pass through the handle of said garment bag when said garment bag is positioned on said spine, said primary straps thereby securing said garment bag to said first and second frame members, said garment bag being positioned on said spine with said first and second sides of said garment bag each positioned adjacent said exterior side of one of said first and second frame members and extending downward from the top peripheral edge of said frame members, with one of said primary straps passed through said handle of said garment bag and across one of said first and second sides of said garment bag, said primary straps having their distal ends in engagement.

8. The combination of claim 7 in which said means for securing said garment bag to said first and second frame members additionally comprises first and second secondary straps extending in first and second loops from opposite ends of one of said first and second frame members, said first and second secondary straps passing through the handle of said garment bag positioned on said spine further to secure said garment bag to said first and second frame members.

9. In combination, a luggage cart and a garment bag, said luggage cart comprising first and second frame members pivotally coupled to each other proximate a top peripheral edge of at least one of said first and second frame members, the coupled top peripheral, edge of said frame members defining a spine supporting said garment bag thereon, said garment bag having a handle and first and second sides extending downward from the top peripheral edge of said frame members and along said frame members, said first and second frame members supporting the first and second sides of said garment bag, said first and second frame members being free to pivot about said spine with respect to one another, and means for selectively limiting pivotal movement of said first and second frame members about said spine with respect to one another, said means for selectively limiting pivotal movement of said first and second frame members defining a maximum angle of separation between said first and second frame members.

* * * * *